United States Patent [19]
Brown

[11] Patent Number: 5,048,289
[45] Date of Patent: Sep. 17, 1991

[54] EXTENDIBLE NOZZLE

[75] Inventor: William S. Brown, Woodland Hills, Calif.

[73] Assignee: Rockwell International Corporation, El Segundo, Calif.

[21] Appl. No.: 366,901

[22] Filed: Jun. 15, 1989

[51] Int. Cl.⁵ ............................ F02K 9/84; F02K 1/52
[52] U.S. Cl. ....................................... 60/267; 239/127.1
[58] Field of Search ................... 60/267, 271, 62.42; 239/265.33, 127.1, 265.43

[56] References Cited

U.S. PATENT DOCUMENTS

| | | | |
|---|---|---|---|
| 3,630,449 | 12/1971 | Butler | 239/127.1 |
| 4,213,566 | 7/1980 | Miltenberger | 239/265.43 |
| 4,245,469 | 1/1981 | Fortini et al. | 239/127.1 |
| 4,313,567 | 2/1982 | Feight | 239/265.33 |
| 4,489,889 | 12/1984 | Inman | 239/265.33 |
| 4,779,799 | 10/1988 | Jancer | 60/271 |
| 4,909,032 | 3/1990 | Horiuchi et al. | 60/267 |

Primary Examiner—Louis J. Casaregola
Assistant Examiner—Laleh Jalali
Attorney, Agent, or Firm—H. Fredrick Hamann; Harry B. Field; David C. Faulkner

[57] ABSTRACT

A thrust nozzle assembly for selective deployment and retraction of an extendible nozzle for a rocket engine.

5 Claims, 3 Drawing Sheets

EXTENDIBLE NOZZLE

BACKGROUND OF THE INVENTION

1. Field of the Invention

This invention relates to a rocket-engine nozzle and especially to an extendible rocket-engine nozzle.

2. Description of Related Art

Rocket engines operating around space stations, orbital transfer vehicles and the like use during their operation, high-expansion-ratio nozzles of greater length than the inner volume of their carrier allows. Therefore, the engine overall length must be reduced during transport, and then extended for operation. Furthermore, for vehicles which would perform an aero-assist maneuver, it is necessary to retract the extendible nozzle for its protection. In addition, redeployment of the extendible nozzle to optimal length must be possible after the aero-assist maneuver has been completed for high efficiency operation of the rocket engine.

OBJECTS OF THE INVENTION

The principle object of this invention is to provide an extendible nozzle which can be deployed and retracted over hundreds of mission cycles to provide optimum efficiency for a space based or Earth based rocket motor.

Another object of the present invention is to provide a deployable and retractable rocket engine nozzle assembly capable of operating in space in the extended position or in the retracted position for aero-assist maneuvers, transportation in the space shuttle or rocket engine servicing at a space station.

Other objects, advantages and novel features of the present invention will become apparent from the following detailed description of the invention when considered in conjunction with the accompanying drawings.

SUMMARY OF THE INVENTION

The objects and advantages of the present invention are realized by providing a thrust nozzle assembly for a rocket engine comprising (a) a regeneratively cooled fixed nozzle section attached to the rocket engine, (b) a heat resistant, radiative cooled, metallic or composite material extendible nozzle section which in a stored position forms a frustoconical sleeve about the fixed nozzle section, (c) nozzle extending and retracting means for selectively extending the extendible nozzle section to a fully extended or deployed position or retracting the extended nozzle to a stored position and, (d) means for effecting a cooled, fluid seal interface and thermally managed environment to maintain an elastic repetitive seal system between the fixed nozzle section and the extendible nozzle when the latter is in an extended functional position.

BRIEF DESCRIPTION OF THE DRAWINGS

The same elements or parts depicted in the figures of the drawings are designated by the same reference characters.

DETAILED DESCRIPTION OF THE PREFERRED EMBODIMENT

Figure 1:
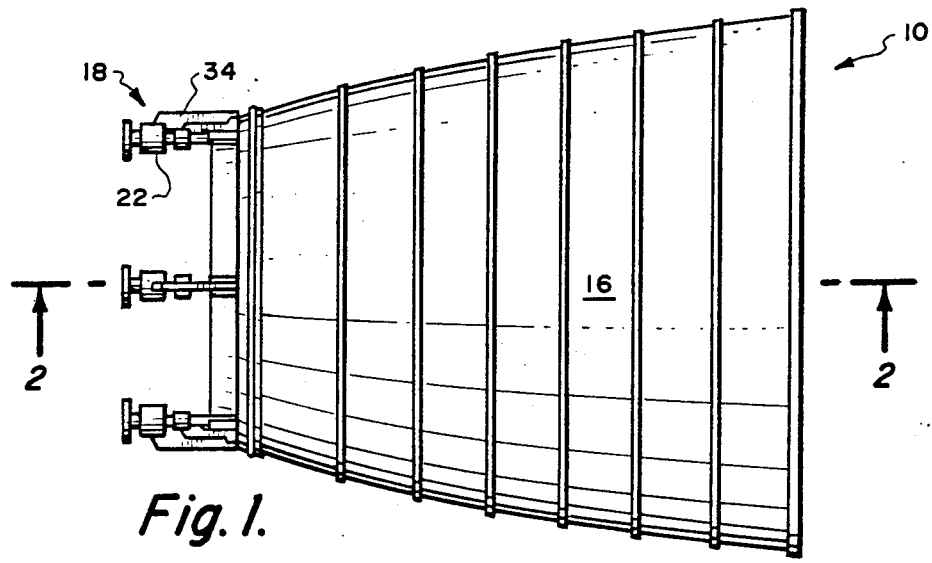
FIG. 1 is a side view schematic illustration of an embodiment of the invention, wherein the metallic or composite extendible nozzle section is in a stored position around the cooled, fixed nozzle section attached to the rocket engine.
Figure 2:
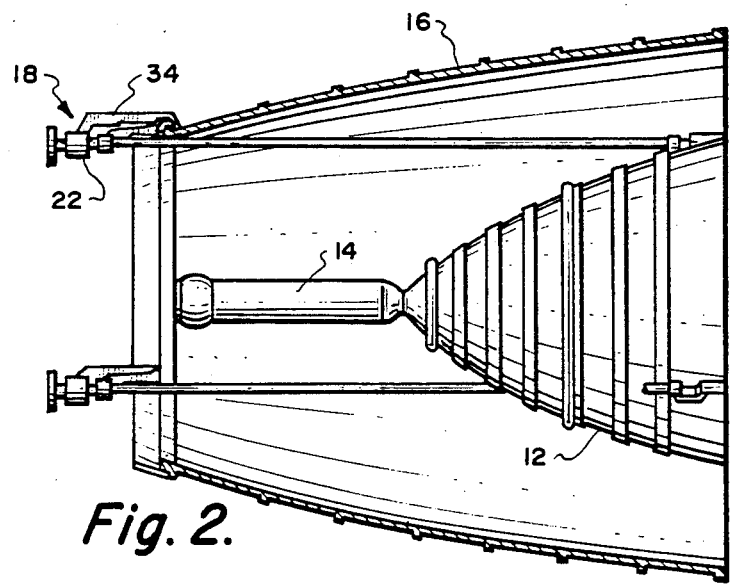
FIG. 2 is a cross-sectional side view schematic illustration of FIG. 1 taken along line 2—2 of FIG. 1, depicting the fixed nozzle section, retracted metallic or composite extendible nozzle section and nozzle extending and retracting means for selectively extending or retracting the extendible nozzle section.
Figures 3, 4:
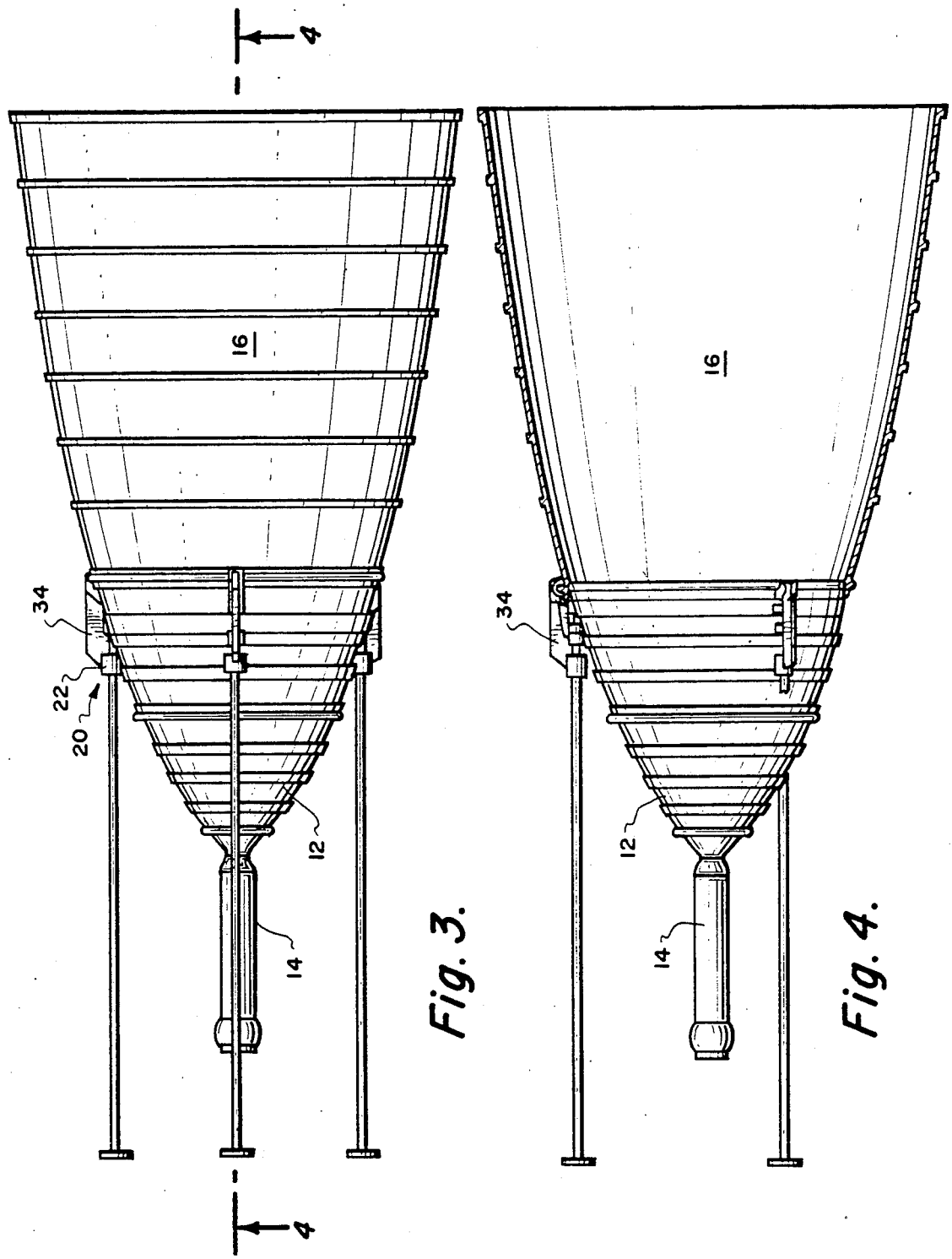
FIG. 3 is a cross-sectional partial side view schematic illustration of the present invention showing the extendible nozzle in its fully deployed position.
FIG. 4 is a partial schematic cross-sectional view taken along line 4—4 of FIG. 3, showing the extendible nozzle section in its fully-deployed position.

As shown in FIGS. 1-4, the thrust nozzle assembly 10 for a rocket engine comprises a regeneratively cooled fixed nozzle section 12 attached to a rocket thrust chamber engine 14 for thermal management loading. In FIG. 2, a heat resistant, radiative-cooled metallic or composite extendible nozzle section 16 forms a frustoconical sleeve about the fixed nozzle section when the extendible nozzle section of the assembly is in a stored position. Shown in FIGS. 2-4 is the nozzle extending and retracting means 18 for selectively extending the extendible nozzle section to a fully extended position, or retracting same to a stored position when operational considerations dictate same. In FIG. 3, the extendible nozzle is shown fully deployed to achieve the greatest possible expansion ratio. As can be seen in this figure, the deployment means includes a plurality of radially-spaced driving units 20 for actuating ball screws 22 (see FIG. 6).

Each driving unit 20 includes a housing 24 attached to the fixed nozzle. The housing contains a rotating bar motorized ball nut 26 that is controlled by a reversible motor (not shown). Synchronization of the movement of ball screws is necessary, and may be accomplished using conventional methods. For example, synchronized step motors may be utilized or adjacent driving units may be connected together by a flexible shaft in order to synchronize the motion of the driving units. One such device for controlling the extension of an extendible nozzle is described in U.S. Pat. No. 4,779,799 incorporated herein by reference.

Figure 5:
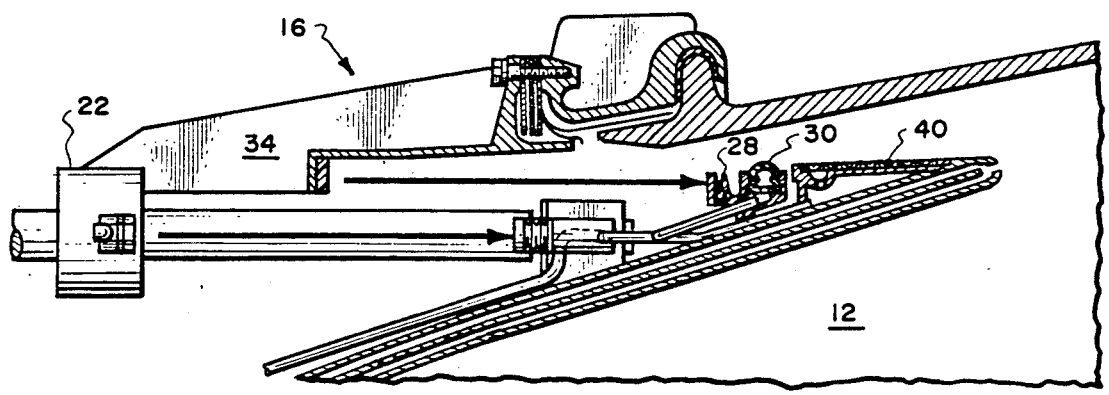
FIG. 5 is a schematic illustration of the seal-lock of the extendible nozzle section as it approaches mating contact with the rearward or exhaust exit portion of the fixed nozzle section of the nozzle assembly.
Figure 6:
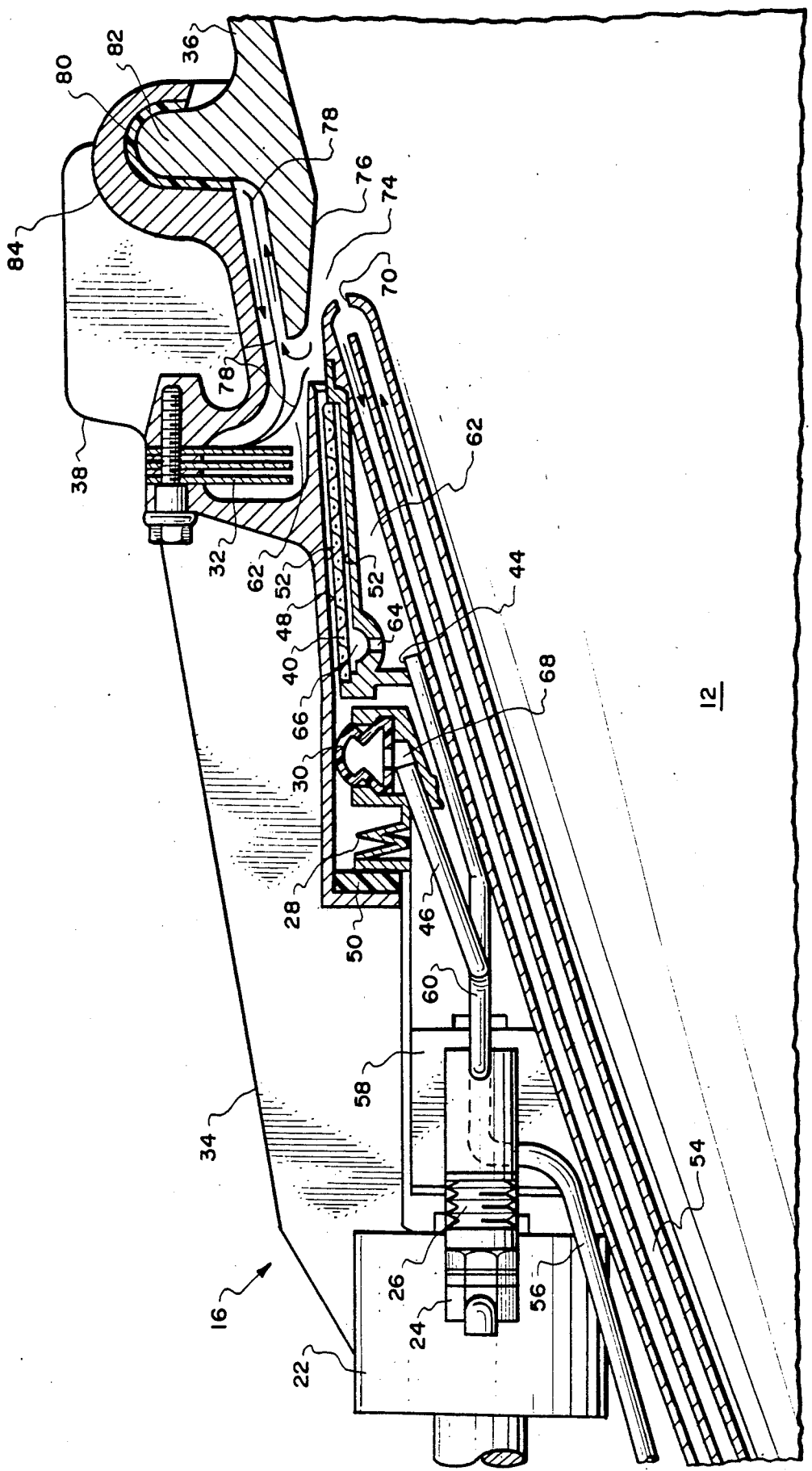
FIG. 6 is an enlarged schematic illustration of the thrust nozzle assembly in a fully extended and functional position, wherein a cool-fluid interface between the fixed nozzle section and the extendible nozzle is defined.

Referring to FIGS. 5 and 6, and as discussed in more detail below, the thrust nozzle assembly further comprises means for providing cooling fluid to select surfaces of the fixed nozzle and extendible nozzle sections. In addition, means for circulating and routing this cooling fluid and contacting the fluid with the select surfaces of the fixed nozzle and extendible nozzle sections as indicated by the arrows, are provided as part of a thermal management system.

To ensure a cool, fluid seal maintaining interface between the fixed nozzle section and the extendible nozzle when the latter is in an extended functional position, the thrust nozzle assembly is further provided with an axial flexible semi-bellows seal 2B and radially mounted pressure seal 30 in cooperative association with thermal isolation rings 32 housed within a segment of the extendible nozzle section. Heat dissipating fin structure 34 is provided in addition to a radiatively cooled extension 36 to the extendible nozzle section which thermal dissipation function is further enhanced by clamp fin 3B.

The aforementioned coolable surface interface zone includes a permeable mesh structure 40 located in the fixed nozzle section and positioned at a coolable surface 42 of the fixed nozzle section. This permeable mesh structure communicates with cooling fluid conduits 44, 46, and cooling fluid flowing through and within the conduits enters into and permeates through the permeable mesh structure, which may be made of stainless steel, to cool the mesh structure and the coolable surfaces 42, 48 of the extendible and fixed nozzle sections by providing cooling propellant or fluid to and between these interfacing surfaces forming a cooling fluid film therein-between.

As previously noted, the thrust nozzle assembly is also provided with a mating seal 50, a semi-bellows seal 2B, and a pressure seal 30, which cooperatively function with the mating surfaces and cooling flow conduits to provide a fluid tight seal and elastic repetitive seal system between the fixed and extendible nozzle sections.

As best seen in FIG. 6 as cooling propellant is caused to flow down the regeneratively cooled fluid conduit 54 of the fixed nozzle a cooling fluid/propellant, such a hydrogen, is also caused to flow through the cooling conduit 56 contained in structural mount 5B where it is directed into a bifurcated coolant duct 60, allowing the flow of coolant into conduits 44, 46 and coolant dead space 62. From space 62 the coolant passes through a coolant metering orifice 64 into the joint coolant inlet manifold 66, and into the permeable mesh structure 40. Simultaneously, cooling fluid is directed via conduit 68 into the radially mounted pressure seal 30 which seal functions to ensure complete sealing at the interfacing surfaces of seal 30 and surface 4B of the fixed and extendible nozzle sections of the thrust nozzle assembly.

In addition to the coolant flow just described, a series of boundary layer coolant holes 70 only one shown located circumferentially around the fluid nozzle aft end provides a positive or metered flow of coolant at the joint exit 74 and the forward end or downstream portion 76 of the extendible nozzle to preclude hot combustion gases from entering into the joint assembly. These coolant holes 70 function in cooperation with coolant dead space cavity 62 and joint coolant inlet manifold 66 to enhance the flow of cooling fluid along the contacting surfaces 48, 52.

Also part of the thermal management system are radiative shields, insulating seal B0 disposed between composite radiatively cooled nozzle extension B2 and clamp B4. Radiative shields 78 may be constructed of highly refractory material such as a titanium alloy which aids in the prevention of heat transference within the thrust nozzle assembly by reflecting heat onto the radiatively cooled composite nozzle forward end 76.

Obviously, many modifications and variations of the present invention are possibly in light of the above teachings. It is, therefore, to be understood that, within the scope of the appended claims, the invention may be practiced otherwise than as specifically described.

What is claimed and desired to be secured by letters patent of the United States is:

1. A thrust nozzle assembly for a rocket engine comprising:

(a) a regeneratively cooled fixed nozzle section attached to a rocket engine;
(b) a heat resistant, radiatively cooled, metallic extendible nozzle section which in a stored position forms a frustoconical sleeve about the fixed nozzle section;
(c) nozzle extending and retracting means for selectively extending the extendible nozzle section to a fully extended position or retracting the extended nozzle to a stored position;
(d) means for effecting a cooled, fluid seal interface and thermally managed environment to maintain an elastic repetitive seal system between the fixed nozzle section and the extendible nozzle when the latter is in an extended functional position;
(e) means for providing cooling fluid to and between interfacing surfaces of the fixed nozzle section and extendible nozzle section;
(f) means for circulating said cooling fluid into contact with said interfacing surfaces of the fixed nozzle and extending nozzle sections, and routing the fluid so as to maintain a replenished cooling fluid in contact with said surfaces;
(g) thermal isolation rings housed within a segment of the extendible nozzle section;
(h) as least one heat dissipating fin structure;
(i) radiative shields;
(j) a radiatively cooled extension to the extendible nozzle section; and
(k) means for joining the fixed cooled nozzle section and the extendible nozzle section.

2. A thrust nozzle assembly for a rocket engine comprising:

(a) a regeneratively cooled fixed nozzle section attached to a rocket engine;
(b) a heat resistant, radiatively cooled, metallic extendible nozzle section which in a stored position forms a frustoconical sleeve about the fixed nozzle section;
(c) nozzle extending and retracting means for selectively extending the extendible nozzle section to a fully extended position, or retracting the extended nozzle to a stored position;
(d) means for effecting a cooled, fluid seal interface and thermally managed environment to maintain an elastic repetitive seal system between the fixed nozzle section and the extendible nozzle when the latter is in an extended functional position;
(e) means for providing cooling fluid to and between interfacing surfaces of the fixed nozzle section and extendible nozzle section;
(f) means for circulating said cooling fluid into contact with said interfacing surfaces of the fixed nozzle and extendible nozzle section, and routing the fluid so as to maintain a replenished cooling fluid in contact with said surfaces;
(g) thermal isolation rings housed within a segment of the extendible nozzle section;
(h) at least one heat dissipating fin structure;
(i) radiative shields;
(j) a radiatively cooled extension to the extendable nozzle section;
(k) means for joining the fixed cool nozzle section and the extendible nozzle section; and
(l) coolable contacting surface interfaces in communicable relationship with a cooling fluid and independently associated with the fixed nozzle and extendible nozzle sections respectively but capable of fluid contact with one another when the extendible nozzle section is in fully extended position.

3. A thrust nozzle assembly for a rocket engine comprising:
   (a) a regeneratively cooled fixed nozzle section attached to a rocket engine;
   (b) a heat resistant, radiatively cooled, metallic extendible nozzle section which in a stored position forms a frustoconical sleeve about the fixed nozzle section;
   (c) nozzle extending and retracting means for selectively extending thee extendible nozzle section to a fully extended position, or retracting the extended nozzle to a stored position;
   (d) means for effecting a cooled, fluid seal interface and thermally managed environment to maintain an elastic repetitive seal system between the fixed nozzle section and the extendible nozzle when the latter is in an extended functional position;
   (e) means for providing cooling fluid to and between interfacing surfaces of the fixed nozzle section and extendible nozzle section;
   (f) means for circulating said cooling fluid into contact with said interfacing surfaces of the fixed nozzle and extendible nozzle sections, and routing the fluid so as to maintain a replenished cooling fluid to contact with said surfaces;
   (g) thermal isolation rings housed within a segment of the extendible nozzle section;
   (h) at least one heat dissipating fin structure;
   (i) radiative shield;
   (j) a radiatively cooled extension to the extendible nozzle section;
   (k) means for joining the fixed cooled nozzle extension and the extendible nozzle section;
   (l) coolable contacting surface interfaces in communicable relationship with a cooling fluid and independently associated with the fixed nozzle and extendible nozzle sections respectively, but capable of fluid contact with one another when the extendible nozzle section is in a fully extended position; and
   (m) a permeable mesh structure located within the fixed nozzle section and positioned at a coolable contacting surface of the fixed nozzle section, which permeable mesh structure communicates with the cooling fluid conduit and cooling fluid flowing through and within the conduit, said fluid further permeating into and through the permeable mesh structure to cool the mesh structure and the coolable surface of the fixed nozzle section by a replenishable cooling fluid film.

4. A thrust nozzle assembly for a rocket engine comprising:
   (a) a regeneratively cooled fixed nozzle section attached to a rocket engine;
   (b) a heat resistant, radiatively cooled, metallic extendible nozzle section which in a stored position forms a frustoconical sleeve about the fixed nozzle section;
   (c) nozzle extending and retracting means for selectively extending the extendible nozzle section to a fully extended position, or retracting the extended nozzle to a stored position;
   (d) means for effecting a cooled, fluid seal interface and thermally managed environment to maintain an elastic repetitive seal system between the fixed nozzle section and the extendible nozzle when the latter is in an extended functional position, said means further comprising:
      (i) a mating seal;
      (ii) a semi-bellows seal;
      (iii) a pressure seal;
   (iv) an insulating seal; and
   (v) fluid cooled surfaces;
   (e) means for providing cooling fluid to and between interfacing surfaces of the fixed nozzle section and extendible nozzle section;
   (f) means for circulating such cooling fluid in the contact with said interfacing surfaces of the fixed nozzle and extendible nozzle sections, and routing the fluid so as to maintain a replenished cooling fluid in contact with said surfaces;
   (g) thermal isolation rings housed within a segment of the extendible nozzle section;
   (h) at least one heat dissipating fin structure;
   (i) radiative shields;
   (j) a radiatively cooled extension to the extendible nozzle section;
   (k) means for joining the fixed cooled nozzle extension and the extendible nozzle section;
   (l) coolable contact surface interfaces in communicable relationship with a cooling fluid and independently associated with the fixed nozzle and extendible nozzle sections respectively, but capable of fluid contact with one another when the extendible nozzle section is in a fully extended position; and
   (m) a permeable mesh structure located within the fixed nozzle section and positioned at a coolable contacting surface of the fixed nozzle which permeable mesh structure communicates with a cooling fluid conduit and cooling fluid flowing through and within the conduit, said fluid further permeating into and through the permeable mesh structure to cool the mesh structure and the coolable surface of the fixed nozzle section by a replenished cooling fluid film.

5. A thrust nozzle assembly for a rocket engine comprising:
   (a) a regeneratively cooled fixed nozzle section attached to a rocket engine;
   (b) a heat resistant, radiatively cooled, metallic extendible nozzle section which in a stored position forms a frustoconical sleeve about the fixed nozzle section;
   (c) nozzle extending and retracting means for selectively extending the extendible nozzle section to a fully extended position, or retracting the extended nozzle to a stored position;
   (d) means for effecting a cooled, fluid seal interface and thermally managed environment to maintain an elastic repetitive seal system between the fixed nozzle section and the extendible nozzle when the latter is in an extended functional position, said means further comprising:
      (i) a mating seal;
      (ii) a semi-bellows seal;
      (iii) a pressure seal;
   (iv) an insulating seal;
   (v) fluid cooling surfaces;
   (e) means for providing cooling fluid to and between interfacing surfaces of the fixed nozzle section and extendible nozzle section, said means further comprising:
      (i) a regeneratively fluid-cooled nozzle;
      (ii) a bifurcating fluid coolant inlet duct;

(iii) fluid coolant conduit;
(iv) a coolant dead space cavity;
(v) a coolant metering orifice;
(vi) a nozzle aperture
(f) means for circulating said coolant fluid in a contact with said interfacing surfaces of the fixed nozzle and extendible nozzle sections, and routing the fluid so as to maintain a replenished cooling fluid in contact with said surfaces;
(g) thermal isolation rings housed within a segment of the extendible nozzle section;
(h) at least one heat dissipating fin structure;
(i) radiative shields;
(j) a radiatively cooled extension to the extendible nozzle section;
(k) means for joining the fixed coolant nozzle extension and the extendible nozzle section;
(l) coolable contact surface interfaces in communicable relationship with the coolant fluid and independently associated with the fixed nozzle and extendible nozzle sections respectively, but capable of fluid contact with one another when the extendible nozzle section is in a fully extended position; and
(m) a permeable mesh structure located within the fixed nozzle section and positioned in a coolable contacting surface of the fixed nozzle section, which permeable mesh structure communicates with a cooling fluid conduit and cooling fluid flowing through and within the conduit, said fluid further permeating into and through the permeable mesh structure to cool the mesh structure and the coolable surface of the fixed nozzle section by a replenishable cooling fluid film.

* * * * *